United States Patent Office 3,707,540
Patented Dec. 26, 1972

3,707,540
1,3-THIAZINES AND THEIR PREPARATION
Gaston Amiard, Thorigny, and Rene Heymes, Romainville, France, assignors to Roussel-UCLAF, Paris, France
No Drawing. Filed Dec. 7, 1966, Ser. No. 599,738
Claims priority, application France, Dec. 9, 1965, 41,613
Int. Cl. C07d 93/08, 99/24
U.S. Cl. 260—243 R      7 Claims

ABSTRACT OF THE DISCLOSURE

Lactones of 2 - (carbonyl-amino-methyl)-5-hydroxymethyl-3,6-dihydro-2H-1,3-thiazine-4-carboxylic acids useful as intermediates for antibiotics of the C-cephalosporine family and their preparation.

The invention relates to novel dihydro-1,3-thiazine compounds of the formula

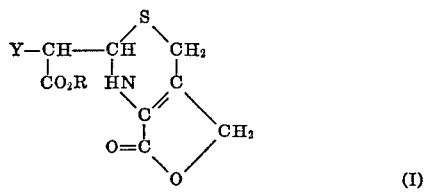

(I)

wherein R is selected from the group consisting of alkyl and aralkyl, Y is selected from the group consisting of —HN—Ac, phthalimido and —NH—R', R' is selected from the group consisting of hydrogen, alkyl and aralkyl and Ac is the acyl radical of an organic carboxylic acid of 1 to 18 carbon atoms and to a novel process for the preparation of the said compounds.

OBJECTS OF THE INVENTION

It is an object of the invention to provide the novel lactones of dihydro-1,3-thiazine-4-carboxylic acids of Formula I.

It is another object of the invention to provide a novel process for the preparation of the lactones of dihydro-1,3-thiazine-4-carboxylic acids of Formula I.

These and other objects and advantages of the invention will become obvious from the following detailed description.

The novel lactones of 5-hydroxymethyl-3,6-dihydro-2H-1,3-thiazine-4-carboxylic acids of the invention have the formula

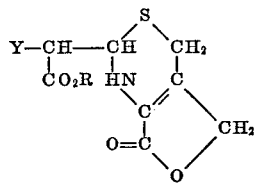

wherein R is selected from the group consisting of alkyl and aralkyl, Y is selected from the group consisting of —HN—Ac, phtalimido and —NH—R', R' is selected from the group consisting of hydrogen, alkyl and aralkyl and Ac is the acyl radical of an organic carboxylic acid of 1 to 18 carbon atoms and to a novel process for the preparation of the said compounds.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid and butyric acid; alkenoic acids, such as undecylenic acid; cycloalkyl carboxylic acids, such as cyclopentyl carboxylic acid and cyclopropyl carboxylic acid; cycloalkyl alkanoic acids, such as cyclopentyl acetic acid and cyclohexyl acetic acid; arylalkanoic acids, such as phenyl acetic acid and phenyl propionic acid; aryl carboxylic acids, such as benzoic acid; phenoxy alkanoic acids, such as phenoxy acetic acid; heterocyclic carboxylic acids, such as furane-2-carboxylic acid; β-ketoalkanoic acids, such as acetylacetic acid and propionylacetic acid.

R' is preferably selected from the group consisting of hydrogen, lower alkyl of 1 to 7 carbon atoms such as methyl, ethyl, propyl, etc. and aryl lower alkyl such as benzyl, trityl, etc. When R' is hydrogen, the mineral or organic acid addition salts of the said compounds can be formed, such as the hydrochloride, sulfate, acetate, etc.

The structure of the compounds of Formula I prefigure that of the 7-amino cephalosporanic acid and its N-acylated derivatives and, therefore, the compounds of Formula I are preferred intermediates for the synthesis of antibiotics of the cephalosporine C family, such as cephalosporine C itself, cephalosporine Cc, cephalosporine CA, 7-phenylacetylamino-cephalesporanic acid and derivatives and analogs thereof. The novel compounds of Formula I can be converted by means of a process described in Comptes Rendus, 263 (1966), 170 to the γ-lactone of D,L - 6H,7H-cis-7-thienyl-acetylamino desacetylcephalosporanic acid of the formula

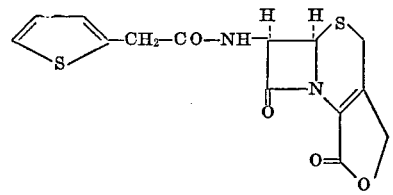

which possesses an antibiotic activity on different germs, particularly on many strains of Staphylococcus aureus, at concentrations of the order of 1 to 10 g./cc.

The preparation of compounds similar to those of Formula I has been tried repeatedly but without any success whatsoever [for example, by Galantay (J. Org. Chem. 29, 1964, page 3560)]. However, it has now been discovered, that it was possible to obtain such compounds by condensing in an inert solvent an ester of 2-Y'-3-aminoacrylic acid of Formula II

(II)

wherein R has the above definition, Y' is selected from the group consisting of —HNAc where Ac is the acyl radical of an organic carboxylic acid of 1 to 18 carbon atoms, of the phthalimido group

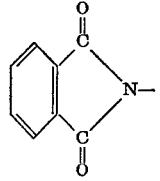

and R"—NH—, R" being selected from the group consisting of an alkyl radical and aralkyl radical with the 1,4-lactone of 2,4-dihydroxy-3-mercaptomethyl - 2 - butenoic acid which has the formula

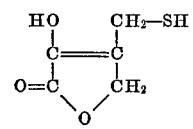

to obtain a dihydro 1,3-thiazine compound of Formula I which if desired can be converted into a dihydro 1,3-thiazine compound of Formula I, wherein Y represents the $NH_2$— group by the usual methods of interchanging the functions with the aid of hydrazine, an acid hydrolysis or a hydrogenolysis. The reaction scheme is illustrated in Table I.

$$HO-C=C-CH_2-SH$$
$$O=C \diagdown O \diagup CH_2 + Y'-C=CH-NH_2$$
$$CO_2R$$

↓

(bicyclic thiazine-lactone structure with substituents Y, $CO_2R$, NH, $CH_2$, C=O, O)

wherein R, Y' and R have the above definitions.

Examples of suitable inert organic solvents are aromatic hydrocarbons such as toluene, benzene, etc.

The 2-Y'-3-amino acrylic acid esters of Formula II can be formed by reacting the corresponding ester of 2-Y'-formylacetic acid, preferably in its enolic form, with ammonia or an ammonium salt.

A modification of the process comprises reacting the 1,4-lactone of 2,4-dihydroxy-3-mercaptomethyl - 2 - butenic acid with the enolic form of the desired ester of 2-Y'-formylacetic acid in an inert organic solvent in the presence of ammonia or an ammonium salt such as ammonium acetate or ammonium nitrate. It is believed that under these conditions the corresponding ester of 2-Y'-3-amino-acrylic acid is formed in situ and then reacts with the said 1,4-lactone. Preferably this reaction is effected in an aromatic hydrocarbon solvent such as toluene or benzene in the presence of ammonia at a pH of about 7.

In the following examples there are described several preferred embodiments to illustrate the invention. However, it should be understood that the invention is not intended to be limited to the specific embodiments.

EXAMPLE I

Preparation of the lactone of 2 - (tert.-butoxycarbonyl-phthalimido-methyl)-5-hydroxymethyl-3,6-dihydro - 2-H-1,3-thiazine-4-carboxylic acid Step A.—Preparation of the 1,4-lactone of 2,4-dihydroxy-3-mercaptomethyl-2-butenoic acid: A mixture of 1.9 gm. of the 1,4-lactone of 2,4-dihydroxy - 3 - acetylthiomethyl - 2 - butenoic acid (prepared according to the process of French Pat. No. 1,365,959) and 19 cc. of absolute ethanol containing 1% of gaseous hydrochloric acid was held at reflux for 2 hours and then the alcohol was removed by distillation under vacuum. The residue was taken up in benzene and distilled under vacuum to eliminate the last traces of hydrochloric acid and ethanol to obtain the 1,4-lactone of 2,4-dihydroxy - 3 - mercaptomethyl-2-butenoic acid in the form of an oil residue which was utilized as such for the next working steps.

Step B.—Preparation of tert.-butyl 2-phthalimido-3-amino-acrylate: A mixture of 20 gm. of tert.-butyl 2-phthalimidoformylacetate and 20 gm. of ammonium acetate in 100 cc. of 50% aqueous tert.-butanol was reacted for 45 minutes at about 60° C. The solution was then concentrated, cooled to room temperature and vacuum filtered. The precipitate was washed with water and dried to obtain 19.1 gm. of tert.-butyl 2-phthalimido-3-aminoacrylate having a melting point of first 130° C., then 180° C.

The product obtained occurred in the form of prisms which were insoluble in water, slightly soluble in alcohol and ether and soluble in chloroform.

*Analysis.*—Calcd. for $C_{15}H_{16}O_4N_2$ (molecular weight = 288.3) (percent): C, 62.49; H, 5.6; N, 9.72. Found (percent): C, 62.7; H, 5.6; N, 9.6.

Ultra-Violet Spectra: (in EtOH)

λmax. 217 mμ $E_{1cm.}^{1\%}=1,360$

Inflection toward 231 mμ $E_{1cm.}^{1\%}=538$

λmax. 240 mμ $E_{1cm.}^{1\%}=534$

λmax. 262–263 mμ $E_{1cm.}^{1\%}=743$

Inflection toward 301 mμ $E_{1cm.}^{1\%}=50$

This compound is not described in the literature.

Step C.—Preparation of the lactone of 2-(tert.-butoxycarbonyl - phthalimido - methyl) - 5 - hydroxymethyl-3,6 - dihydro - 2 - H - 1,3 - thiazine - 4 - carboxylic acid: The 1,4-lactone of 2,4-dihydroxy-3-mercaptomethyl-2-butenoic acid from Step A was admixed with 1.9 gm. of tert.-butyl 2-phthalimido-3-amino-acrylate from Step B in 25 cc. of toluene. Then, the toluene was distilled off under vacuum in an hour and the residue was taken up in 10 cc. of refluxing ether and then left at room temperature for a half hour. The resulting precipitate was vacuum filtered and recrystallized from a mixture of methylene chloride and methanol to obtain the lactone of 2-(tert.-butoxycarbonyl - phthalimido - methyl) - 5 - hydroxymethyl - 3,6-dihydro - 2 - H - 1,3 - thiazine - 4 - carboxylic acid having a melting point of 215° C. (decomposition).

The product occurred in the form of colorless prisms which were insoluble in alcohol and soluble in chloroform.

*Analysis.* — Calcd. for $C_{20}H_{20}O_6N_2S$ (molecular weight=416.44) (percent): C, 57.68; H, 4.84; N, 6.73; S, 7.70. Found (percent): C, 57.7; H, 4.9; N, 6.6; S, 7.5.

Ultra-Violet Spectra:

λmax. 219 mμ $E_{1cm.}^{1\%}=1,070$

Inflection toward 240 mμ $E_{1cm.}^{1\%}=304$

λmax. 269 mμ $E_{1cm.}^{1\%}=119$

Inflection toward 291 mμ $E_{1cm.}^{1\%}=74$

Inflection toward 300 mμ $E_{1cm.}^{1\%}=57$

This compound is not described in the literature.

By employing the same process and starting with methyl 2-phthalimido-3-amino-acrylate prepared as below, the lactone of 2-(methoxycarbonyl-phthalimidomethyl) - 5 - hydroxymethyl - 3,6 - dihydro - 2 - H - 1,3-thiazine-4-carboxylic acid was obtained.

Preparation of methyl 2-phthalimido-3-amino-acrylate: A mixture of 10 gm. of methyl phthalimido-formylacetate, 10 gm. of ammonium nitrate and 40 cc. of methanol was heated to reflux and slowly neutralized with 17 cc. of a 2.2 N ammonia solution in methanol. Then, the greater portion of the methanol was distilled off and then 40 cc. of water were slowly added at a temperature of 45° C. The reaction mixture was then iced and the formed precipitate was vacuum filtered, washed with 50% aqueous methanol and finally dried at a temperature of 80° C. to obtain 9.2 gm. of methyl 2-phthalimido-3-amino-acrylate having a melting point of 190° C.

*Analysis.*—Calc'd for $C_{12}H_{10}O_4N_2$ (molecular weight= 246.22) (percent): C, 58.53; H, 4.09; N, 11.38. Found (percent): C, 58.6; H, 4.3; N, 11.7.

Ultra-Violet Spectra: (in EtOH)

λmax. 217 mμ $E_{1cm.}^{1\%}=1,670$

λmax. 230–231 mμ $E_{1cm.}^{1\%}=692$

λmax. 239–240 mμ $E_{1cm.}^{1\%}=656$

λmax. 263–264 mμ $E_{1cm.}^{1\%}=910$

Inflection toward 301 mμ $E_{1cm.}^{1\%}=62$

This compound is not described in the literature.

EXAMPLE II

Preparation of the lactone of 2-(tert-butoxycarbonyl-phthalimide-methyl) - 5 - hydroxymethyl-3,6-dihydro-2-H-1,3-thiazine-4-carboxylic acid The 1,4-lactone of 2,4-dihydroxy-3-mercaptomethyl-2-butenoic acid, formed from 2.5 gm. of the 1,4-lactone of 2,4-dihydroxy-3-acetylthiomethyl-2-butenoic acid and 25 cc. of ethanol containing 1% hydrochloric acid, was dissolved in 25 cc. of toluene and after the addition of 2.9 gm. of tert.-butyl 2-phethalimido-formylacetate thereto, the reaction mixture was neutralized by slowly bubbling ammonia through the mixture. The solvent was then distilled off under vacuum and the residue was taken up in refluxing ether. The mixture was then allowed to stand at room temperature for a half hour and then vacuum filtered. The precipitate was washed with ether and dissolved in methylene chloride. The solution was filtered, concentrated to half its volume, diluted with methanol and the remainder of the methylene chloride was distilled off to obtain the lactone of 2-(tert.-butoxycarbonyl-phthal-imido-methyl)-5-hydroxymethyl - 3,6 - dihydro-2-H-1,3-thiazine-4-carboxylic acid having a melting point of 215° C. (decomposition). The product was identical to the product of Example I.

EXAMPLE III

Preparation of the lactone of 2-(tert.-butoxycarbonyl-phenylacetamido-methyl) - 5 - hydroxymethyl-3,6-dihydro-2H-1,3-thiazine-4-carboxylic acid Step A.—Preparation of tert.-butyl 2-phenylacetamido-formylacetate: 5 gm. of 2-benzyl-4-hydroxymethylene-oxazolone [prepared according to the process described in "The Chemistry of Penicillin," page 807 (1949)] were dissolved in 50 cc. of tert.-butanol by heating at reflux for 15 minutes under an atmosphere of nitrogen. The solution was then evaporated to dryness and the residual oil was taken up in ether and filtered and the filtrate was evaporated to dryness. The residue thus obtained could be utilized as such or crystallized from petroleum ether which gave tert.-butyl phenylacetamido-formylacetate in crystalline form having a melting point of 98° C.

The product occurred in the form of colorless needles which were insoluble in water and in dilute aqueous acids, soluble in dilute aqueous alkalis, in alcohol, ether, acetone, benzene and chloroform.

Analysis.—Calcd. for $C_{15}H_{19}O_4N$ (molecular weight= 277.32) (percent): C, 64.96; H, 6.91; N, 5.05. Found (percent): C, 64.8; H, 6.7; N, 5.1.

This compound is not described in the literature.

Step B.—Preparation of tert.-butyl 2-phenylacetamido-3-amino-acrylate: The raw tert.-butyl phenylacetamido-formylacetate from step A was introduced into 25 cc. of tert.-butanol and after 12 cc. of water and 5 gm. of ammonium acetate were added thereto, the mixture was heated for 5 minutes at a temperature of 80° C. Then, the solvent was removed by vacuum distillation and the residue was taken up in ether, agitated and then vacuum filtered. The precipitate was washed with ether and dried, to obtain 3.3 gm. of tert.-butyl 2-phenylacetamido-3-amino-acrylate having a melting point of 170° C.

After recrystallization from ethyl acetate, the product occurred in the form of colorless prisms which were insoluble in water and ether and soluble in alcohol and chloroform.

Analysis.—Calcd. for $C_{15}H_{20}O_3N_2$ (molecular weight= 276.33)(percent): C, 65.19; H, 7.3; N, 10.14. Found (percent): C, 65.3; H, 7.2; N, 10.1.

This compound is not described in the literature.

Step C.—Preparation of the lactone of 2-(tert.-butoxy-carbonyl-phenylacetamido - methyl) - 5 - hydroxymethyl-3,6-dihydro-2H-1,3-thiazine-4-carboxylic acid: The 1,4-lactone of 2,4 - dihydroxy-3-mercaptomethyl-2-butenoic acid, prepared from 2 gm. of the 1,4-lactone of 2,4-dihydroxy-3-acetylthio methyl-2-butenoic acid, was dissolved in 25 cc. of toluene and after 1.38 gm. of tert.-butyl-2-phenylacetamido-3-amino-acrylate were added to this solution, the toluene was distilled off for 45 minutes while maintaining the volume steady by addition of toluene. The distillation was completed then under vacuum and the residue was subjected to chromatography through silica gel with elution with a chloroform-ethyl acetate-ethanol mixture (75:20:5), and fractions of 3 cc. were recovered. Fractions 22 to 50 were combined and evaporated to dryness and the product thus obtained was taken up in ether saturated with water. The solution was concentrated to a small volume and the resulting precipitate was vacuum filtered, washed with ether and dried to obtain the lactone of 2-(tert.-butoxycarbonyl-phenylacet-amido-methyl) - 5 - hydroxymethyl-3,6-dihydro-2-H-1,3-thiazine-4-carboxylic acid having a melting point of about 115° C.

After recrystallization from aqueous ethoxy-ethanol, the product occurred in the form of colorless needles which were insoluble in water and ether and soluble in alcohol, acetone and chloroform.

Analysis.—Calcd. for $C_{20}H_{24}O_5N_2S$ (molecular weight=404.48) (percent): C, 59.39; H, 5.98; N, 6.93; S, 7.93. Found (percent): C, 59.5; H, 6.0; N, 6.8; S, 7.8.

Ultra Violet Spectra: (in EtOH)

$\lambda$ max. 275 m$\mu$ $E^{1\%}_{1cm.}=94$

Inflection toward 253 m$\mu$ $E^{1\%}_{1cm.}=73$ $\lambda$ max. 277–278 m$\mu$ $E^{1\%}_{1cm.}=94$ Inflection toward 260 m$\mu$ $E^{1\%}_{1cm.}=87$ This compound is not described in the literature.

EXAMPLE IV

Preparation of the lactone of 2-(tert.-butoxycarbonyl-formamido-methyl) - 5 - hydroxymethyl - 3,6 - dihydro-2-H-1,3-thiazine-4-carboxylic acid Step A.—Preparation of tert.-butyl 2-formamido-formyl-acetate: A mixture of 24.6 gm. of potassium tert.-butylate and 120 cc. of benzene was cooled to —5° C. and then a mixture of 31.8 gm. of tert.-butyl N-formyl-glycinate, obtained according to the process described by UGI et al. [Ber. 94, 2814 (1961)], and 81.6 gm. of tert.-butyl formate was slowly added thereto with agitation. Then, the temperature was allowed to rise to 25° C., and the mixture was allowed to stand for 90 hours with agitation and with a stream of nitrogen passing through the said mixture. Thereafter, 50 cc. of water were introduced into the reaction mixture, which was decanted and again extracted with 50 cc. of water. The combined aqueous extracts were washed with ether and then acidified to pH 2 with 10 N hydrochloric acid. Next, 50 cc. of methylene chloride were added thereto and decanted. The aqueous phase was saturated with sodium chloride and extracted twice with 50 cc. of methylene chloride. The combined methylene chloride phases were dried over magnesium sulfate and evaporated to dryness under vacuum. After recrystallization from isopropyl ether, 19 gm. of tert.-butyl 2-formamido-formylacetate having a melting point of 180° C. were obtained.

The product occurred in the form of colorless prisms which were soluble in water, alcohol, acetone and chloroform and slightly soluble in ether.

Analysis.—Calcd. for $C_8H_{13}O_4N$ (molecular weight= 187.19) (percent): C, 51.33; H, 7.00; N, 7.48. Found (percent): C, 51.3; H, 7.0; N, 7.6.

This compound is not described in the literature.

Step B.—Preparation of tert.-butyl 2-formamido-3-amino-acrylate: 561 mg. of tert.-butyl 2-formamido-formylacetate, 3 cc. of tert.-butanol, 3 cc. of N ammonium hydroxide and 1 gm. of ammonium acetate were admixed and this mixture was kept at a temperature of 70° C. for 1 hour with agitation under an atmosphere of nitrogen. Then, the reaction mixture was evaporated to dryness under vacuum and then the residue was taken up in 5 cc. of ethyl acetate and the excess ammonium acetate was crystallized out. The solution was vacuum filtered, washed with ethyl acetate, filtered and evaporated to dryness under vacuum. The residue obtained was taken up in 3 cc. of ether and kept under agitation in an ice bath for 4 hours, vacuum filtered and washed with iced ether to obtain 275 mg. of tert.-butyl 2-formamido-3-amino-acrylate having a melting point of 124° C.

The product occurred in the form of colorless prisms which were soluble in water, in alcohol and in acetone and insoluble in ether.

Analysis.—Calcd. for $C_8H_{14}O_3N_2$ (molecular weight= 186.21) (percent): C, 51.6; H, 7.58; N, 15.04. Found (percent): C, 51.5; H, 7.5; N, 14.9.

This compound is not described in the literature.

Step C.—Preparation of the lactone of 2-(tert.-butoxycarbonyl-formamido-methyl) - 5 - hydroxymethyl-3,6-dihydro-2H-1,3-thiazine-4-carboxylic acid: The 1,4-lactone of 2,4-dihydroxy-3-mercapto-methyl-2-butanoic acid, prepared from 14.1 gm. of the 1,4-lactone of 2,4-dihydroxy-3-acetylthiomethyl-2-butenoic acid, was added to 9.3 gm. of tert.-butyl 2-formamido-3-amino-acrylate in 180 cc. of benzene. The mixture was refluxed for 16 hours, after which it was evaporated to dryness under vacuum. The resultant residue was taken up in 100 cc. of methylene chloride and then washed first with ammonium hydroxide and then with water. The aqueous phase was extracted with 50 cc. of methylene chloride. The methylene chloride phases were combined, dried over magnesium sulfate, vacuum filtered and evaporated to dryness under vacuum. By successive recrystallizations first from a mixture of ethyl acetate and ether at a temperature of 0° C., then from methylene chloride at reflux, 1.2 gm. of the lactone of 2-(tert.-butoxycarbonyl-formamido-methyl)-5-hydroxy-methyl - 3,6 - dihydro - 2 - H - 1,3 - thiazine-4-carboxylic acid having a melting point of 190° C. were obtained.

The product occurred in the form of colorless prisms which were soluble in acetone and insoluble in water, ether and chloroform.

Analysis.—Calcd. for $C_{13}H_{18}O_5N_2S$ (molecular weight =314.35) (percent): C, 49.67; H, 5.77; N, 8.91; S, 10.20. Found (percent): C, 49.5; H, 6.1; N, 8.7; S, 10.2.

This compound is not described in the literature.

EXAMPLE V

Preparation of the lactone of 2-(tert.-butoxycarbonyl-amino-methyl) - 5 - hydroxymethyl - 3,6 - dihydro-2-H-1,3-thiazine-4-carboxylic acid 1.25 gm. of the lactone of 2-(tert.-butoxycarbonyl-phthalimido-methyl) - 5 - hydroxymethyl - 3,6 - dihydro-2-H-1,3-thiazine-4-carboxylic acid were dissolved in 10 cc. of dioxane and after 0.19 gm. of hydrazine hydrate in 10 cc. of dioxane were added thereto the mixture was allowed to stand for 15 hours at room temperature. Then, the reaction mixture was evaporated in a rotary evaporator under 1 mm. vacuum over a water bath at room temperature. The residue thus obtained was taken up in an 0.2 N hydrochloric acid solution and agitated for 2 hours at room temperature. Next, the solution was iced for a half hour and the resulting precipitate was vacuum filtered and washed with water. The filtrate obtained and the combined wash waters were evaporated to dryness and the residue was dissolved in 10 cc. of methanol. The solution was concentrated to a small volume and crystallization was started with an addition of ether. The resulting crystals were vacuum filtered, washed with ether and dried to obtain 0.79 gm. of the hydrochloride of the lactone of 2-(tert.-butoxycarbonyl-amino-methyl)-5-hydroxymethyl - 3,6 - dihydro-2-H-1,3-thiazine-4-carboxylic acid which could be recrystallized from water with an addition of alcohol and ether. The product had a melting point of about 180° C. (decomposition).

The product occurred in the form of colorless needles which were insoluble in ether, soluble in alcohol and very soluble in water and in dilute aqueous acids.

This compound is not described in the literature.

The free base was obtained by introducing 250 mg. of the hydrochloride obtained above into 0.3 cc. of water, and then adding dropwise an aqueous solution containing 10% sodium bicarbonate until a pH-value of 7–8 was attained. Then, the solution was vacuum filtered, and the crystallized product was taken up in methylene chloride and the solution was dried and vacuum filtered. The filtrate was condensed to a small volume, and crystallization was started by the addition of ethyl acetate. After vacuum filtering, 100 gm. of the lactone of 2-(tert.-butoxy-carbonyl-amino-methyl) - 5 - hydroxymethyl-3,6-dihydro-2-H-1,3-thiazine-4-carboxylic acid having a melting point of 138° C. were obtained.

The product occurred in the form of colorless prisms which were insoluble in ether and slightly soluble in water, alcohol and chloroform.

Analysis. — Calcd. for $C_{12}H_{18}O_4N_2S$ (molecular weight=286.35) (percent): C, 50.33; H, 6.33; N, 9.79; S, 11.19. Found (percent): C, 50.3; H, 6.6; N, 9.8; S, 11.1.

Infra-red spectra (in chloroform): Absorptions at 1,758 cm.$^{-1}$, 1,733 cm.$^{-1}$, 1,687 cm.$^{-1}$, and 3,400–3,315 cm.$^{-1}$.

This compound is not described in the literature.

This compound in the form of its hydrochloride, when treated with a solution of phenylacetyl chloride in methylene chloride in the presence of triethylamine, yielded again the lactone of 2-(tert.-butoxy-carbonyl-phenylacetamido-methyl)-5-hydroxymethyl - 3,6 - dihydro-2-H-1,3-thiazine-4-carboxylic acid.

Various modifications of the products and process of the invention may be made without departing from the spirit or scope thereof and it is to be understood that the invention is to be limited only as defined in the appended claims.

We claim:

1. A lactone of 5-hydroxymethyl-3,6-dihydro-2H-1,3-thiazine-4-carboxylic acid of the formula

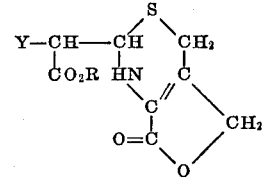

wherein R is selected from the group consisting of lower alkyl, trityl and phenyl lower alkyl, Y is selected from the group consisting of —HN—Ac and —NH—R′, R′ is selected from the group consisting of hydrogen, lower alkyl, trityl and phenyl lower alkyl and Ac is the acyl radical of an organic carboxylic acid of 1 to 18 carbon atoms.

2. The lactone of 2-(tert.-butoxycarbonylphenylacetamidomethyl) - 5 - hydroxymethyl - 3,6 - dihydro-2H-1,3-thiazine-4-carboxylic acid.

3. A compound of claim 1 wherein the compound is selected from the group consisting of the lactone of 2-(tert.-butoxycarbonyl-aminomethyl) - 5 - hydroxymethyl-3,6-dihydro-2-H-1,3-thiazine-4-carboxylic acid and its acid addition salts.

4. A process for the preparation of a lactone of 5-hydroxymethyl-3,6-dihydro-2H-1,3-thiazine - 4 - carboxylic acid of the formula

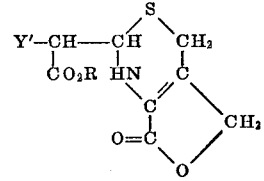

wherein R is selected from the group consisting of lower alkyl, trityl and phenyl lower alkyl, Y′ is selected from the group consisting of —NHAc, phthalimido and —NHR″, R″ is selected from the group consisting of lower alkyl, trityl and phenyl lower alkyl and Ac is the acyl radical of an organic carboxylic acid which comprises reacting an ester of 2-Y′-3-aminoacrylic acid with the 1,4-lactone of 2,4-dihydroxy-3-mercaptomethyl-2-butenoic acid in an inert organic solvent to form the said lactone of 5-hydroxymethyl - 3,6 - dihydro-2H-1,3-thiazine-4-carboxylic acid.

5. The process of claim 4 wherein the said lactone of 5-hydroxymethyl - 3,6 - dihydro-2H-1,3-thiazine - 4 - carboxylic acid is subjected to a function interchange to form the corresponding lactone wherein Y′ is —$NH_2$.

6. The process of claim 4 wherein the ester of 2-Y′-3-amino-acrylic acid is formed in situ from the enolic form of the corresponding ester of 2-Y′-formyl acetic acid and a compound selected from the group consisting of ammonia and an ammonium salt.

7. The lactone of 2-(tert.-butoxycarbonyl-formamidomethyl)-5-hydroxymethyl - 3,6 - dihydro-2-H-1,3-thiazine-4-carboxylic acid.

References Cited

UNITED STATES PATENTS

| | | | |
|---|---|---|---|
| 3,231,571 | 1/1966 | Eardley et al. | 260—243 |
| 3,320,244 | 5/1967 | Brunnstrom | 260—243 |
| 3,391,141 | 7/1968 | Gottstein et al. | 260—243 |
| 3,117,126 | 1/1964 | Hoover et al. | 260—326 X |
| 3,236,892 | 2/1966 | Petracek | 260—326 X |

JOHN M. FORD, Primary Examiner

U.S. Cl. X.R.

260—243 C; 424—246